May 26, 1925.                                                1,538,930
R. E. DUPLESSIS
STARTING AND STOPPING MECHANISM
Filed April 12, 1920            2 Sheets-Sheet 2

INVENTOR
René E. Duplessis
By his Attorney,
Nelson M. Howard

Patented May 26, 1925.

1,538,930

UNITED STATES PATENT OFFICE.

RENÉ E. DUPLESSIS, OF BEVERLY, MASSACHUSETTS, ASSIGNOR TO UNITED SHOE MACHINERY CORPORATION, OF PATERSON, NEW JERSEY, A CORPORATION OF NEW JERSEY.

STARTING AND STOPPING MECHANISM.

Application filed April 12, 1920. Serial No. 373,229.

*To all whom it may concern:*

Be it known that I, RENÉ E. DUPLESSIS, a citizen of the United States, residing at Beverly, in the county of Essex and State of Massachusetts, have invented certain Improvements in Starting and Stopping Mechanisms, of which the following description, in connection with the accompanying drawings, is a specification, like reference characters on the drawings indicating like parts in the several figures.

This invention relates to starting and stopping mechanisms and more particularly to clutch and brake mechanisms which are directly under the control of the opertor.

In many different classes of machines such, for instance, as fastening inserting machines, which comprise several mechanisms of more or less complexity, it is not infrequently necessary to make adjustment of some part or parts or to replace a broken or worn part in order to keep the machine at its highest efficiency and in perfect running order. In making adjustments or repairs in many machines as heretofore constructed, accidents have frequently occurred involving injury to the partialy dismantled machine or to the operator or repair man, due to the fact that the starting means for the machine is usually in such a position that it may be unintentionally or inadvertently actuated, thus initiating power operation of the machine and of the parts undergoing adjustment or replacement.

The illustration of the embodiment of the invention selected for description shows its application to the lasting and fastening inserting machine which is disclosed in United States Letters Patent No. 1,291,754, granted Jan. 1, 1919 on an application filed by Matthias Brock. It is to be understood, however, that the invention is not to be considered as limited in its application to machines of this type.

It is an object of this invention to provide improved means for preventing accidental or undesired operation of the starting mechanism and thus power operation of the machine, even though the manually operable starting means be actuated in such manner as would normally result in starting the machine in operation. It is a further object of the invention to provide means of the character described which will be especially simple in construction and efficient for the purpose intended and of such a construction moreover as will positively ensure against the possibility of unintentional operation of the machine by the power means provided for the purpose.

In one aspect the invention provides improved means for preventing throwing in the clutch accidentally, the illustrated construction and arrangement having also provision for simultaneously releasing the brake so that the shaft may be turned over by hand without danger of power operation of the shaft and without meeting the resistance to the turning of the shaft which is normally imposed by the braking means.

In another aspect the invention comprises, in an organization having a braking means for the shaft which is normally released when the clutch is thrown into operation to start the machine but which is applied to bring the shaft to a stop when it is unclutched from the source of power, the construction being such that the brake remains operative while the machine is at rest, the provision of improved means for releasing the shaft from the braking means or otherwise rendering the braking means inoperative while the machine is at rest.

Other features of constructions and other combinations of parts will be described in the detailed specification and pointed out in the appended claims.

In the drawings:—

Figure 1:
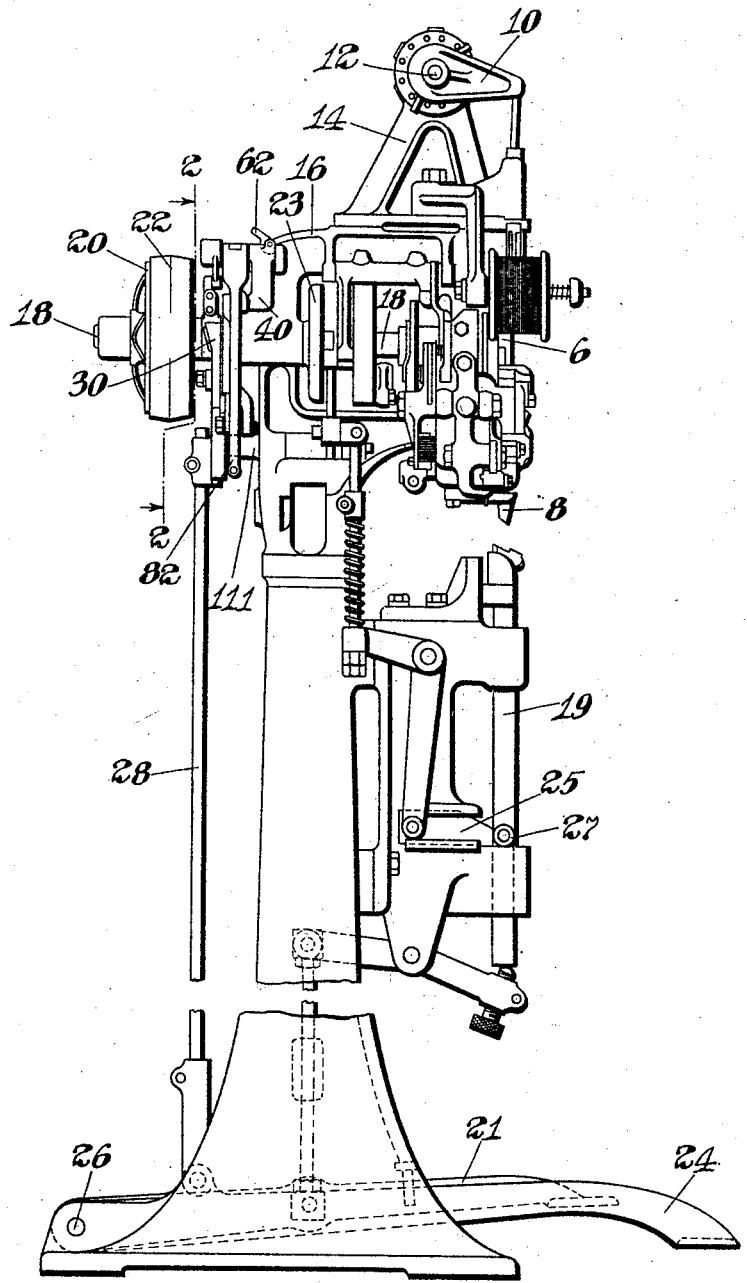
Figure 1 is a view in side elevation of a machine embodying the invention.

In the illustrative machine, the fastening driving mechanism comprises a driver bar 6 carrying a driver (not shown) which operates to drive fastenings through the combined nozzle and lasting tool 8. For actuating the driver bar in the direction of its operative stroke, there is provided a spring pressed arm 10 pivoted at 12 on a bracket 14 attached to the frame 16 of the machine. Mounted in the frame is a shaft 18 provided with cams for operating the wire feeding and cutting mechanisms and for raising the driver bar, as shown and described in Letters Patent No. 1,016,930, granted February 13, 1912 on an application of William H. Borden. At the front of the machine is a work support 19 operated directly from a treadle 21 and also by power means including a cam 23 on the shaft 18 and connections to wedges, one of which is shown at 25, arranged to operate upon rolls 27 carried by the work support, in the manner fully disclosed in said patent to Brock. Work in the form of a shoe upper and a sole both assembled on a last may be presented to the fastening guiding and lasting tool 8 through proper operation of the work support 19 upon which the work is positioned, and the upper progressively lasted and secured to the sole. At each cycle of the machine, a portion of the upper is wiped over the side of the last by the tool 8 and a fastening inserted at the termination of the wiping operation to secure the upper in lasted condition. This operation is repeated until the entire upper or any desired portion thereof is lasted. Upon one end of the shaft 18 there are located the fast and loose clutch members 20 and 22, the latter being also the power pulley which is moved to the left in Fig. 1 to engage with the clutch member 20 upon depression of the starting lever 24. As shown, the treadle 24 is pivoted at 26 on the frame of the machine and is connected by a rod 28 to a wedge member 30, the construction and arrangement being such that upon depression of the treadle the wedge is moved downwardly to force the loose pulley 22 into firm engagement with the fixed pulley 20, thus clutching the power pulley 22 to the shaft 18 to drive the same. The construction thus far described is that disclosed in the said patent to Brock.

Figure 3:
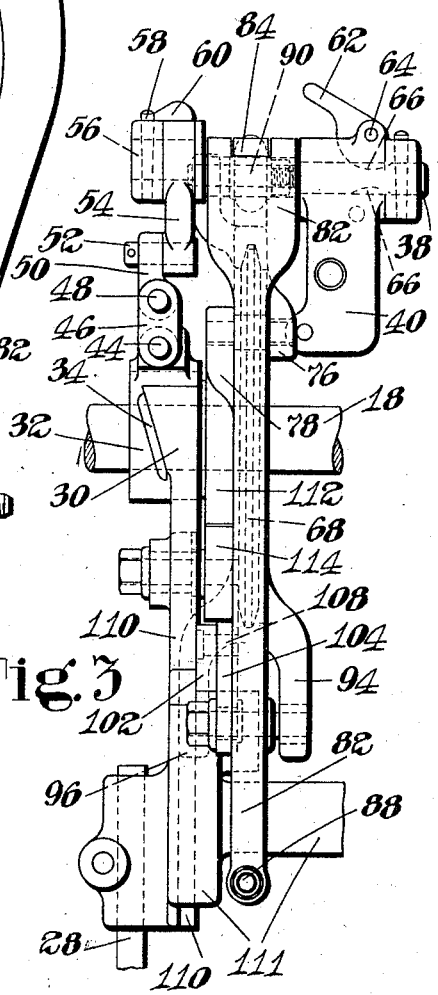
Fig. 3 is a side view of the mechanism shown in Fig. 2.
Figure 4:
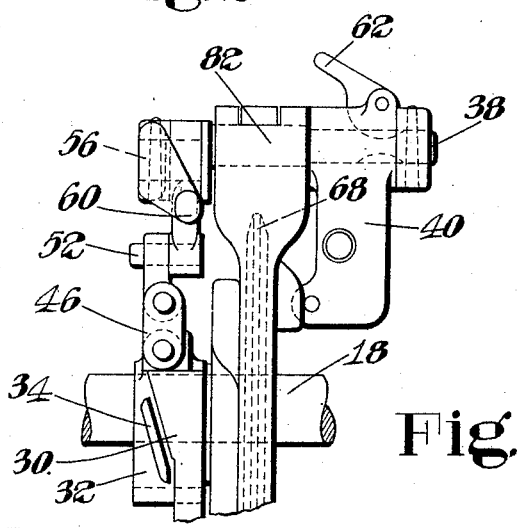
Fig. 4 is a view similar to Fig. 3 showing the upper parts in a different position.

In order that downward movement of the wedge member 30 which accompanies depression of the starting lever 24 may not be followed by an actuation of the clutch, means is provided for conditioning the wedge member and the parts which normally co-operate therewith in such manner that operation of the wedge member will fail to operate the clutch. In the illustrative construction a collar 32, provided with abutments 34 inclined to co-operate with correspondingly inclined surfaces on the wedge member 30, is mounted to slide vertically with respect to the wedge member 30, the arrangement being such that the abutments carried thereby may be so displaced relatively to the wedge member that the latter cannot act on the abutments. In the construction shown the collar 32 which surrounds the shaft 18 is provided with a slot 36, thus permitting movement of the collar transversely with respect to the shaft, and is supported in normal operative position by a link connection to a stub shaft 38 mounted in a bracket 40 attached to the frame 16 of the machine. Conveniently the collar 32 carries in an extension 42 a pin 44 upon which is pivoted a link 46, the other end of which turns freely on a pin 48 carried by a second link 50 mounted for free pivotal movement on a pin 52 extending laterally from a third link 54 loosely mounted on an eccentric portion 56 of the stub shaft 38. Fixed by a pin 58 to the shaft 38 is a hand lever 60 for rocking the shaft, the said lever in the construction shown being fixedly attached to the eccentric portion 56 of the shaft. In will be clear that when the lever 60 is turned over to the right in Fig. 2 and into the position shown in Fig. 4, the collar 32 will be moved downwardly through the described link connection with the eccentric 56 as the latter is progressively rotated from its uppermost position shown in Fig. 2 to its lowermost position shown in Fig. 4. In the latter part of this downward movement the extension 42 of the collar engages with the upper end of the wedge member 30 and forces it downwardly for a purpose which will be hereinafter set forth. Since the eccentric in its lowermost position is directly beneath the center of the shaft 38, there is little or no tendency to displace the eccentric laterally to relieve the pressure on the wedge member 30. However, to insure that the parts will remain in position to lock the clutch operating members in inoperative position there is provided a finger latch member 62 pivoted at 64 in the bracket 40 and having a portion to engage selectively in slots 66 in the shaft 38, the said slots being so arranged as to be directly opposite each other so that the latch 62 may engage therewith to hold the shaft locked at each limit of its turning movement. It will be clear from an inspection of Fig. 4 that when both the collar 32 and the wedge member 30 are locked in their lowermost positions, there is no possibility of co-operation taking place between the wedge surfaces on the wedge member 30 and the abutments 34. When, however, the collar 32 is restored to its operative position by throwing the handle 60 around to the left as in Figs. 2 and 3, and the wedge member 30 has assumed its normal position of rest, as indicated in said figures, downward movement of the wedge member will result in moving the collar 32 to the left in Figs. 1 and 3 and thus force the loose pulley 22 into firm contact with the clutch member 20 which is fast on the shaft 18, with the result that operation of the machine follows so long as the treadle 24 remains depressed.

In connection with the clutch mechanism there is provided preferably a braking means normally operative to brake the shaft when the loose pulley is unclutched so as to stop the shaft always at the same point in the cycle, the construction being such, moreover, as to release the brake as the clutch is being operated to initiate operation of the machine. As shown, the braking means comprises a brake disk 68 fixedly secured to the shaft 18 and brake members 70, 72 and 74 so arranged as to engage with nearly all of the peripheral portion of the brake disk, each brake member having an approximately V-shaped slot to engage over and upon the double beveled edge of the brake disk. Conveniently, the brake member 70 has extensions 76 which overlap similar extensions 78 and 80 at the upper ends of the brake members 72 and 74, respectively, and through which pivot pins are passed to secure the brake members together with provision for relatively free movement with respect to each other. Hingedly mounted together upon the shaft 38 are brake operating levers 82 and 84 connected together at their lower ends by a spring 86, a bolt 88 being provided in the lower end of lever 82 and adjustable as indicated in said lower end of the lever so that the tension of the spring 86 may be adjusted as desired. As shown, the brake member 70 is secured to the lever 84 by means of a bolt 90 which passes through an elongated slot in the lever 84, and is adjustably secured in the slot by a collar and a nut on the bolt, and holds the brake member 70 adjustably and pivotally secured to the lever 84. Since the lever member 84 is pivoted on the shaft 38 considerably at one side of a vertical plane passing through the shaft 18, movement of the lever 84 about its pivot point results in moving the brake member 70 toward and from the brake disk, thus applying or removing the brake member as the case may be. Brake members 72 and 74 each have slotted extensions 94, 96 through which pass pins 98, and 100, respectively, thus pivotally and slidably securing the brake members to the brake levers 82 and 84. Connected to these same pins are links 102 and 104 which have their adjacent ends pivotally connected together (Figs. 2 and 3) by means of a pin 108. One of the links has an abutment 109 indicated in dotted lines in Fig. 2 for contact with the roll 114 carried fixedly attached to an extension of the rod 28. It will be understood that depression of the starting treadle 24, accompanied by the corresponding downward movement of the rod 28 and of the roll 114, causes the toggle links 102, 104 to move toward straightened position with the result that the brake levers 82, 84 are moved away from each other about their pivots on the shaft 38. The link 104 has a slot 105 extending longitudinally thereof and engaging slidably on the pin 98 so as to provide for adjustment of the brake members 70, 72 and 74 to the brake disk. This movement of the brake levers removes the brake members 70, 72 and 74 from contact with the brake disk 68. As before stated, this releasing of the brake members from the brake disk takes place at the beginning of the movement of the clutch members into engagement with each other through the operation of the wedge 30 upon the collar 32. As soon as the starting treadle is released it is moved upwardly through the action of a spring (not shown) and perforce the rod 28 and the attached roll 114 move upwardly, thus permitting the spring 86 to draw the brake levers 82, 84 toward each other to effect the application of the brake members to the brake disk.

It will be clear from the foregoing description that provision is made for relieving the shaft of the action of the brake at the same time that the clutch operating wedge member is locked in inoperative position. The means for thus releasing the brake comprises, as above described, the extension 42 on the collar 32, which extension provides shoulders or abutments for engaging with the upper surface of the wedge member 30 to force it downwardly toward the termination of the downward movement of the collar 32. By thus moving the wedge member downwardly the roll 114 fixedly attached thereto is also carried downwardly, thus tending to straighten the toggle 102, 104, which action removes the brake members from the brake disk in the manner already described. With the clutch operating mechanism rendered inoperative and the braking means released in the manner set forth in the foregoing description, it will be clear that the shaft may be turned by hand without the resistance which would be normally encountered because of the operation of the braking means and without danger of power being applied to the shaft with the possibility of injury to the operator or to the repair man or to the partially dismantled machine.

As in prior constructions there is provided on the shaft 18 a cam 112 for operation upon the roll 114 adjustably secured in the upper portion of the wedge slide 110, which latter is guided in a slotted projection 111 extending from the frame of the machine. The purpose of this arrangement is obviously to hold the clutch operating wedge member 30 in clutch operating position for a complete cycle of operations of the machine, the brake being likewise held released during the same period, the cam being so shaped as to permit the wedge member 30 to rise at the end of a single revolution and thus permit unclutching of the clutch members. As will be understood, a spring (not shown) operates normally to return the starting treadle 24 to its upper position of rest, in which the clutch members are unclutched and power pulley runs loosely on the shaft 18.

Figure 2:
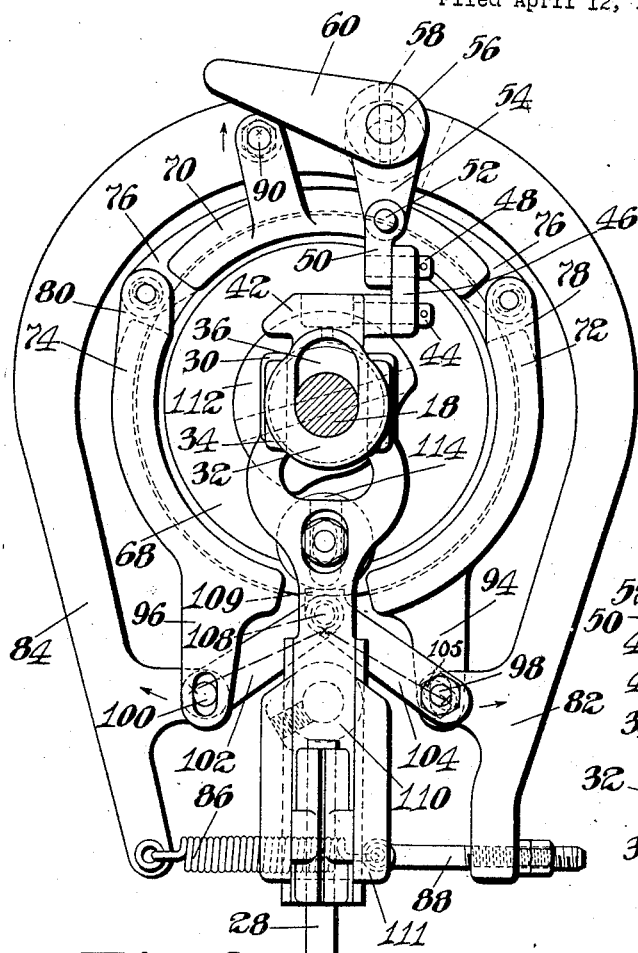
Fig. 2 is a section taken along the line 2—2 of Fig. 1.

It is thought that the mode of operation of the illustrative machine will be clear from the foregoing description but it may be briefly recapitulated as follows:—When it is desired to turn the shaft over by hand as in making repairs, the machine will first be rendered inoperative by locking the clutch controlling means in inoperative position and this is done by first manipulating the finger latch 62 so that the shaft 38 may be turned, thus permitting the hand lever 60 to be swung over to the right in Fig. 2. This movement of the hand lever lowers the collar 32 so that the inclined abutments 34 thereon are displaced relatively to the wedge member 30 in such a way that the said wedge member cannot produce the required movement of the loose pulley into clutching relation with the fixed pulley to start power operation of the machine. As the collar 32 approaches the limit of its downward movement shoulders on the collar extension 42 contact with the upper end of the wedge member and force it downwardly against the action of the treadle lifting spring, the result of this movement being to free the brake disk 68 from the action of the braking members 70, 72 and 74. Hence the clutch is inoperative to start the machine, even if some one inadvertently steps upon the treadle, and the braking means is also inoperative, thus making it easy to turn the shaft over by hand in trying out the adjustment of the various parts of the fastening forming and driving mechanisms. After repairs, or such adjustments as were necessary, have been completed the machine may be readily returned to operative condition by releasing the finger latch 62 and turning the handle lever 60 back to its original position, shown in Fig. 2, by which operation the brake is again applied and the clutch controlling wedge members placed in operative relation to each other so that depression of the starting treadle will result in power operation of the main shaft of the machine.

Having thus described my invention, what I claim as new and desire to secure by Letters Patent is:—

1. In a mechanism of the class described, a shaft, a loose and a fixed clutch member on the shaft, a collar on the shaft, a wedge member normally movable on the collar to force the latter against the loose clutch member to move the latter into operative connection with the fixed clutch member, and means for relatively displacing the wedge member and the collar so that the wedge member, when it is operated in the manner which normally causes operation of the clutch, cannot operate on the collar to effect clutching of the loose and fixed clutch members.

2. In a mechanism of the class described, a shaft, a loose and a fixed clutch member on the shaft, a collar on the shaft, a wedge member normally operative to force the collar against the loose clutch member to move the latter into operative connection with the fixed clutch member, and means for moving the collar to displace it relatively to the wedge member so that the latter, when it is operated in the manner which normally causes operation of the clutch, cannot act on the collar to cause engagement of the loose and fixed clutch members.

3. In a mechanism of the class described, a shaft, a loose and a fixed clutch member on the shaft, a collar on the shaft, a wedge member normally operative to force the collar against the loose clutch member to move the latter into operative connection with the fixed clutch member, and a hand lever connected to the collar for moving the latter relatively to the wedge member so that the latter cannot operate on the collar to cause operative connection between the loose and fixed clutch members on the shaft.

4. In an apparatus of the class described, a shaft, clutch members on the shaft, a braking means for the shaft comprising members adapted to engage frictionally a brake surface on the shaft, means normally operative to release the braking means and to control the clutch members operative for the application of power to the shaft, and a single means for rendering the clutch controlling means inoperative and for spreading the braking members apart to release the brake so that the shaft may be turned by hand free of the resistance normally interposed by the braking means.

5. In an apparatus of the class described, a shaft, clutch members on the shaft, means for operatively connecting the clutching members to apply power to the shaft, said means comprising a collar on the shaft and a wedge member co-operating with the collar to cause co-operating of the clutch members, a braking means, a hand lever, connections between the hand lever and the collar for displacing the latter relatively to the wedge member whereby the wedge member is rendered inoperative to cause co-operation of the clutch members, and means operated from the collar to free the braking means.

6. In an apparatus of the class described, a shaft, clutching members on the shaft, means for causing the co-operation of the clutching members to apply power to the shaft, said means comprising a collar on the shaft and a wedge member normally operable to move the collar for causing clutching action of the clutching members on the shaft, braking means for the shaft, and a single manually operable means for rendering the wedge member inoperative and for releasing the braking means.

7. In an apparatus of the class described, a shaft, a fixed and a loose clutch member on the shaft, means for causing co-operative engagement with the fixed and loose clutch members comprising a collar on the shaft and a wedge member for moving the collar in operative direction, a braking means for the shaft, a hand lever, and connections between the hand lever and the collar for moving the collar to inoperative position with respect to the wedge member and for releasing the braking means.

8. In an apparatus of the class described, a shaft, a fixed and a loose clutch member on the shaft, means for causing co-operative engagement of the fixed and loose clutch members comprising a collar on the shaft and a wedge member for moving the collar in operative direction, a braking means for the shaft, a hand lever, connections between the hand lever and the collar for moving the collar to inoperative position with respect to the wedge member and for releasing the brake, and means for locking the hand lever in its brake releasing position.

9. In a mechanism of the class described, a shaft, a fixed and a loose clutch member on the shaft, a braking means for the shaft comprising members arranged to embrace the shaft and engage frictionally a brake surface thereon, manually operable means for moving the loose clutch member into contact with the fixed clutch member and thus applying power to the shaft and simultaneously releasing the braking means, said braking means being normally applied when the machine is at rest, and means under the control of the operator for spreading apart the braking members to render the braking means inoperative while the machine is at rest.

10. In a mechanism of the class described, a shaft, a fixed and a loose clutch member on the shaft, a wedge member for moving the loose clutch member into operative connection with the fixed clutch member, a braking means for the shaft normally operative frictionally to engage a braking surface on the shaft when the machine is at rest, a single means for rendering the wedge member inoperative to engage the clutch members with each other and for releasing the braking means and means for locking the braking means in inoperative condition.

11. In a mechanism of the class described, a shaft, a loose and a fixed clutch member on the shaft, a treadle, a collar on the shaft, a wedge member normally operative, through direct connection with the treadle, to force the collar against the loose clutch member to move the latter into operative connection with the fixed clutch member, a braking means for the shaft which becomes operative when the shaft is unclutched from the loose clutch member, and a single means for rendering the wedge member inoperative to move said collar and for releasing said braking means.

12. In an apparatus of the class described, a shaft, clutch members on the shaft, an expansible and contractible braking means for the shaft normally operative while the machine is at rest, means operative to release the braking means and simultaneously to render the clutch members operative for the application of power to the shaft, and means independent of the second-mentioned means for expanding the braking means while the machine is at rest so that the shaft may be turned by hand free of the resistance normally interposed by the braking means.

13. In an apparatus of the class described, a shaft, clutching members on the shaft, means for operatively connecting the clutching members to apply power to the shaft, said means comprising a collar on the shaft and a wedge member co-operating with the collar to cause co-operating of the clutch member, a braking means for the shaft normally operative while the machine is at rest, a hand lever, and connections between the hand lever and the collar for operating the braking means to free the shaft while the machine is at rest.

14. In an apparatus of the class described, a shaft, clutching members on the shaft, means for causing the co-operation of the clutching members to apply power to the shaft, braking means for the shaft normally operative while the machine is at rest, manually operable means independent of the first-mentioned means for releasing the braking means while the machine is at rest, and a member for locking said last-mentioned means in either operative or inoperative position.

15. In an apparatus of the class described, a shaft, clutching members on the shaft, means for causing the co-operation of the clutching members to apply power to the shaft, braking means for the shaft normally operative while the machine is at rest, manually operable means for releasing the braking means while the machine is at rest, means comprising a latch and a rotary shaft, for locking said last-mentioned means in inoperative position, and a manually operable member for controlling the application of the braking means.

16. In an apparatus of the class described, a shaft, a fixed and a loose clutch member on the shaft, a braking means for the shaft, a treadle and connections for causing co-operative engagement of the fixed and loose clutch members and for simultaneously releasing the brake on the shaft, a hand lever, and connections between the hand lever and the braking means for releasing the brake while the machine is at rest.

In testimony whereof I have signed my name to this specification.

RENÉ E. DUPLESSIS.